S. C. HATFIELD.
APPARATUS FOR MAKING ANNULAR TUBES.
APPLICATION FILED MAR. 31, 1913. RENEWED MAY 13, 1916.
1,208,777.
Patented Dec. 19, 1916.
2 SHEETS—SHEET 1.
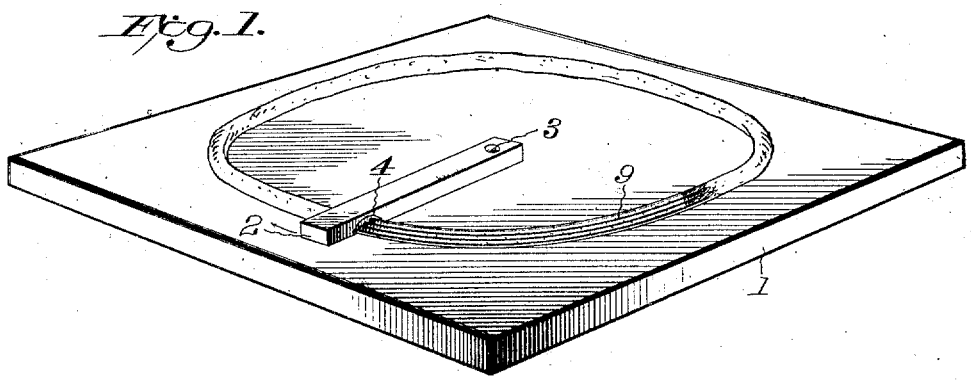
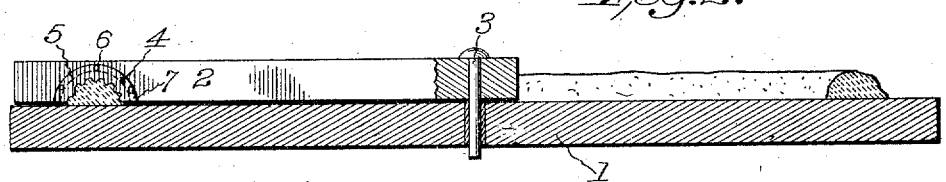
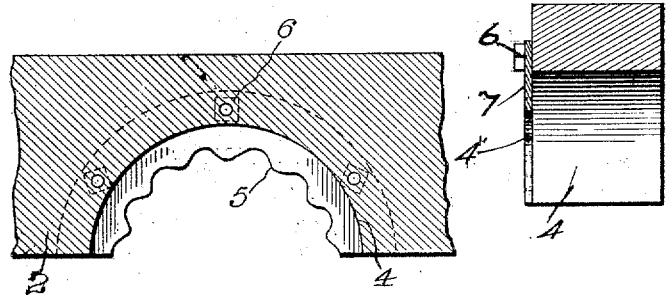
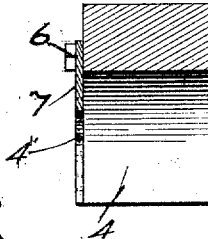
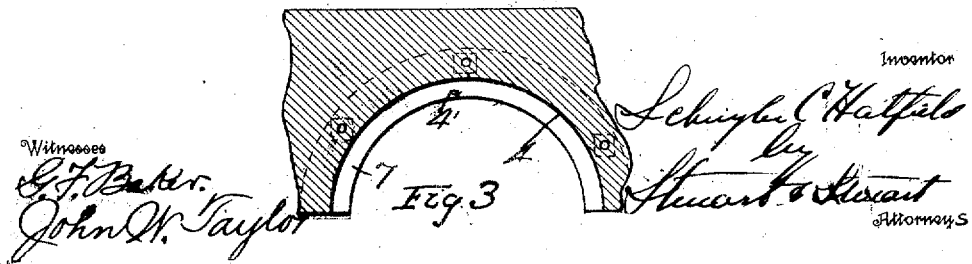

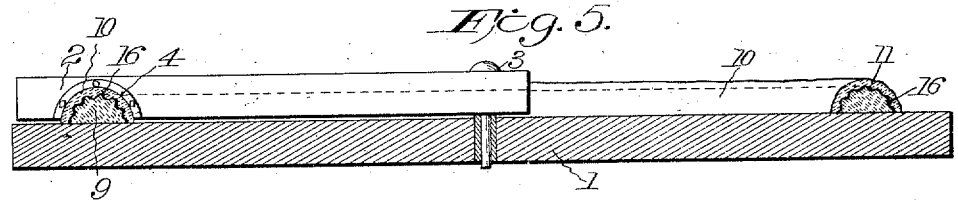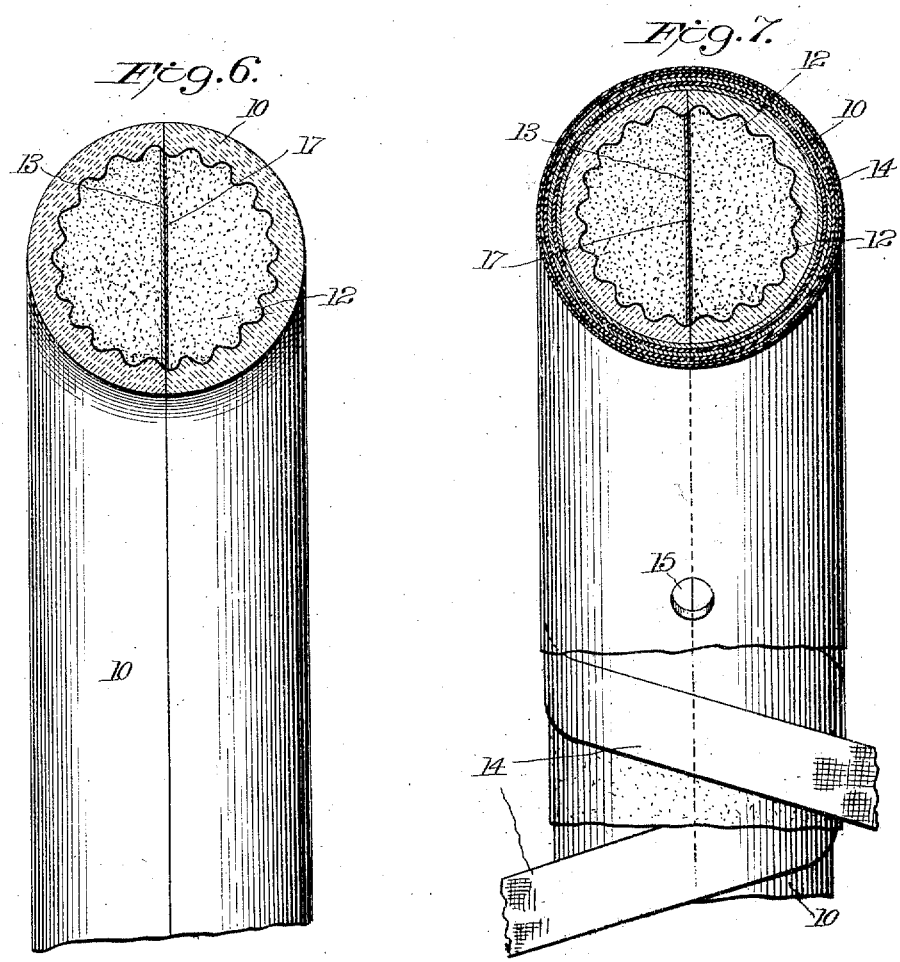

UNITED STATES PATENT OFFICE.

SCHUYLER C. HATFIELD, OF BALTIMORE, MARYLAND.

APPARATUS FOR MAKING ANNULAR TUBES.

1,208,777.  Specification of Letters Patent.  Patented Dec. 19, 1916.

Application filed March 31, 1913, Serial No. 757,834. Renewed May 13, 1916. Serial No. 97,432.

*To all whom it may concern:*

Be it known that I, SCHUYLER C. HATFIELD, a citizen of the United States of America, residing in the city of Baltimore, State of Maryland, have invented certain new and useful Improvements in Apparatus for Making Annular Tubes, of which the following is a specification.

This invention relates to a new apparatus for making single tube pneumatic tires.

Single tube tires of the nature described can be made by coating a permanent form, then slitting the rubber, removing the tube from the form and vulcanizing to close the break made for the purpose of freeing the tire from the form. Such rubber tires with their treads reinforced by means of fabric were found quite satisfactory for use on bicycles, but they are not of sufficient strength to resist the pneumatic pressures which are necessary to support the heavy motor vehicles of the present day. For this purpose a tire whose walls are reinforced throughout by heavy fabric is used, but such tires under the present practice are necessarily of the double tube variety, the outer tube or shoe being open along its entire inner periphery, the opening being closed by the rim. This opening provides easy means for removing the tire fabric from the form, but with the single tube tire no such opening exists, and if a tire made of fabric and rubber is cut to remove it from the form, the opening cannot be closed to advantage so as to give the tire the necessary strength at least to so close it is exceedingly expensive.

The object of the present invention is to provide a form or internal mold for use in manufacturing a single tube tire composed of rubber and fabric, the latter being embedded in the rubber and wound about the circumference of the tube, so that the walls of the tire throughout and at all points are strengthened and supported by the fabric, and the tire thus formed may be made of sufficient strength to support the heaviest motor vehicles now in use.

As a result of my invention I provide a temporary internal mold or form of comparatively fragile material, which, while capable of supporting the fabric and resisting the tension thereof during setting of the materials, may be easily broken up and reduced to a powdered or granular form so that it can be removed from the tube by way of the valve opening or any other suitable opening which is closed in finishing the tire.

The mold is wound with fabric, coated with rubber and vulcanized, and when the vulcanizing process is complete, the inner mold or form is broken up by beating the tire and the material composing the mold, thus reduced to a powder or to a quantity of otherwise finely divided particles, is removed through the valve opening.

The mold used in its preferred form is built up of two annular rings of substantially semi-circular cross-section, the flat face being in the plane of the ring. The rings or annular members thus described are, in the practice of the method, preferably formed on a flat molding board or support upon which a swinging arm is pivotally mounted, and the arm is apertured or notched in the form of the cross-section of the annular members of the mold at a point spaced from the center or pivot by a distance equal to the radius of the tire. To form the annular members referred to, the molding material, which is preferably plaster of Paris, is applied to the board and distributed along the circumference swung by the notch when the arm is rotated about its center. When sufficient of the material is in place, the arm is given a turn or two about its center and the annulus is formed. However, it is found desirable in order that the internal mold may be easily broken up within the tire, to have the annular members hollow. This is easily accomplished by the use of an annular core to which the molding material is applied in a rough coat instead of being distributed along the board. After the core is thus coated, the rotation of the swinging arm forms the annulus as previously described. When the molding material has set, the annulus is removed and placed on a suitable support with the annular opening upward. The receptacle thus formed is filled with sand or other finely divided material and the opening is preferably covered with plaster of Paris or the equivalent to prevent the escape of the sand. To form the mold two annular members are placed flat face to flat face. They are then wound with fabric and coated with rubber, and vulcanized as previously described.

The accompanying drawings illustrate an apparatus constructed according to my invention and the operation thereof.

Figure 1 is a perspective of the molding board showing the molding arm and an annular core in the process of formation. Fig. 2 is a section of the same. Fig. 3 is a transverse section through the end of the molding arm showing the mold former in position. Fig. 3ª is a similar view showing the core former. Fig. 4 is a longitudinal section of the same portion of the molding arm showing the mold former in position. Fig. 5 is a view corresponding to Fig. 2 showing the apparatus in the process of forming a hollow annular mold ring of semi-circular cross-section. Fig. 6 is a transverse section through the finished mold. Fig. 7 is a similar view showing a tire in the process of formation, the rubber coating being cut away to show the fabric.

The apparatus, as illustrated, consists of a flat molding board 1, a swinging molding arm 2 pivotally mounted on the board at 3, the arm being cut away or notched at 4 to clear the mold or otherwise adapted to support a mold forming plate 7, the plate being apertured in the form of the mold to be formed anul secured to the arm by means of bolts 6, so that the forming plate overlies the aperture in the arm. Usually the mold is formed in two sections divided on a plane at right angles to the axis of the tire, and therefore the aperture 4' of the mold former is substantially semi-circular, and the notch in the mold and the opening in the former are spaced from the pivot 3 by a distance equal to the radius of the tires to be formed.

In the operation to be described, the annular internal molds used are preferably made hollow, and the aperture within the mold is formed by means of an annular core 9. The rotating arm 2 may be used to advantage in making the annular core which is necessary to the formation of the hollow within the mold. To adapt the apparatus to the production of the core, the core former 5 is used instead of the mold former. The core former is a plate apertured to conform to the cross-section of the core and is secured to the arm 2 by means of bolts 6 which are also used to hold the mold former 7. Preferably the core has a ribbed surface and the opening in the core former is notched or scalloped to give this effect. Both the formers are so constructed that they may be applied to the arm and removed therefrom and interchanged at will.

The preferred form of the invention is used as follows: If the internal molds or forms upon which the tire is to be built up are to be hollow, the core former 5 is applied to the arm. The arm is pivotally mounted on the board, and a quantity of molding material in plastic form, preferably plaster of Paris or the like, is applied to the board in the path of the notch 4, then the arm is rotated forming an annular core 9, see Figs. 1 and 2. The core is then coated with some suitable material as shellac 16 which will prevent the mold sections which are to be made over the core, from sticking thereto. The core former 5 is removed at any convenient time, and the mold former is secured to the arm. A quantity of molding material is applied to the core 9 and the arm is rotated, giving the plastic material, indicated by reference character 10, an annular form, substantially semi-circular and similar in cross-section to the cross-section of the tire, divided centrally, as illustrated in Fig. 5. After the plastic material has set, the pivoted arm 4 having first been disconnected, the annular members 10 are removed and placed on a suitable support with the opening 11 turned upward. The aperture 12 in the annulus 10 is then filled with sand or other finely divided material, and the surface corresponding to the opening 11 is covered with plaster of Paris or other plastic 13 and smoothed by means of a flat instrument. Two of the annular members 10 are then placed with the flat faces 17 in contact and wound with a strip of suitable fabric or fibrous material 14 to be used in the construction of the tire, after which the mold with the fabric is covered with rubber and vulcanized. The tire may be made of any suitable thickness, the layers of textile fabric and rubber alternating, and the layers of fabric are helically wound about the mold and the adjacent layers are oppositely wound or disposed, as illustrated, to resist stresses in all directions. The outside layer is usually of rubber, and when the material is all in place on the mold, the tire is vulcanized. A suitable valve opening 15 is formed by burning the rubber and fabric or in any other convenient manner. The whole mold is then reduced to a powder or otherwise broken by beating the tire. The finely divided material is shaken out through the valve opening 15, and the opening is closed by the insertion of the valve.

If it is desired to use solid ring members instead of making them hollow as described, it is obvious that this can be done by omitting the core. In this way the process can be simplified but in this form it is considered less effective.

Thus a seamless tire is formed of continuous fabric coated and impregnated with rubber, and by this method the fabric may be made as heavy and the tire as strong as desired, giving a single tube tire of sufficient strength to be used with the heaviest motor vehicle. The apparatus may be varied to a considerable extent, the material for forming the molds may be selected to suit various conditions, the molds may be made either hollow or solid as the frangibility of the mold material varies and the apparatus itself may be widely changed within the scope of the invention.

What I claim and desire to secure by Letters Patent is:

1. An internal mold or form for pneumatic tires consisting of a hollow, annular plaster shell filled with finely divided material.

2. A core or mold for pneumatic tires consisting of a plaster of Paris shell in the form of an annular tube filled with sand.

3. An internal mold or form for pneumatic tires consisting of a frangible shell filled with finely divided material.

4. An annular internal mold or form for pneumatic tires consisting of a frangible shell formed in two halves, the shell being separated on the central plane of the annulus, the halves being filled with finely divided material, the open surface being covered and the halves superimposed one upon another to form an annulus having a frangible shell with a finely divided filling.

Signed by me at Baltimore, Maryland, this 29th day of March, 1913.

SCHUYLER C. HATFIELD.

Witnesses:
 ZELLA KUHN,
 EDWIN F. SAMUELS.